United States Patent [19]

Battaglia

[11] Patent Number: 4,976,032
[45] Date of Patent: Dec. 11, 1990

[54] HAND IMPLEMENT FOR PICKING CITRUS FRUIT AND THE LIKE

[75] Inventor: Anthony D. Battaglia, Cincinnati, Ohio

[73] Assignee: Chiquita Brands, Inc., Cincinnati, Ohio

[21] Appl. No.: 418,134

[22] Filed: Oct. 6, 1989

[51] Int. Cl.⁵ .................. B26B 27/00; A01G 3/02
[52] U.S. Cl. ..................................... 30/298; 56/328.1
[58] Field of Search ............... 56/239, 240, 241, 289, 56/328.1; 30/90.4, 90.8, 186, 231, 232, 244, 291, 298

[56] References Cited

U.S. PATENT DOCUMENTS

| | | |
|---|---|---|
| 137,918 | 4/1873 | Harts . |
| 274,707 | 3/1883 | Bowers . |
| D. 301,825 | 6/1989 | Kilpelainen ........................ D8/7 |
| 509,990 | 12/1893 | Wood ................................. 30/232 |
| 666,986 | 1/1901 | Thunen ........................... 56/328.1 |
| 792,089 | 6/1905 | Towers ............................. 30/232 |
| 964,788 | 7/1910 | Keating ............................ 30/232 |
| 1,092,207 | 4/1914 | Fredrickson . |
| 1,444,976 | 2/1923 | Mandley ........................... 30/298 |
| 1,858,170 | 3/1928 | Poole . |
| 2,788,573 | 4/1957 | Schanno ........................... 30/232 |
| 2,807,267 | 9/1957 | Walker . |
| 2,819,521 | 1/1958 | Parker . |
| 3,593,803 | 7/1971 | Ibach ............................. 30/298 X |

Primary Examiner—Ramon S. Britts
Assistant Examiner—Ezio Disante
Attorney, Agent, or Firm—Fish & Richardson

[57] ABSTRACT

An implement for hand picking citrus fruit and the like includes an elongated cutter having first and second opposed blades suitable for attachment, e.g., by means of a glove, with the first blade disposed along a finger of a picker's hand and the second, opposed blade disposed along a second, adjacent finger of the picker's hand. The cutter defines a first, open outer end for passage of a citrus fruit stem between the blades, and a second, relatively more closed inner end. A method for picking fruit using the implement of the invention is also described.

7 Claims, 2 Drawing Sheets

HAND IMPLEMENT FOR PICKING CITRUS FRUIT AND THE LIKE

BACKGROUND OF THE INVENTION

The invention relates to implements for picking fruit by hand.

Fruit, e.g. oranges, grapefruit, lemons, limes and the like, may be picked from trees by hand. Typically, each fruit is grasped, then twisted and pulled to separate the fruit from the tree.

The objectives of the invention include providing an implement for hand picking citrus fruit and the like in a more efficient manner, providing a hand implement for picking fruit in a single motion and providing a gloved implement with opposed blades disposed to cut fruit from tree in a single grasping motion.

SUMMARY OF THE INVENTION

According to one aspect of the invention, an implement for hand picking citrus fruit and the like, comprises an elongated cutting member having a first blade and an opposed second blade, the elongated cutting member defining a first, open outer end for passage of a citrus fruit stem between the first blade and the second blade, and the elongated cutting member defining a second, relatively more closed inner end, and means for attachment of the elongated cutting member to a picker's hand with the first blade along a first finger of the picker's hand and the second blade along a second, adjacent finger of the picker's hand.

In preferred embodiments of this aspect of the invention, the means for attachment comprises at least one sleeve member adapted to receive a picker's finger snugly therethrough, the implement further comprises a glove, the means for attachment comprising fingers of the glove; and the first blade and the second opposed blade intersect at the second, inner end.

According to another aspect of the invention, a gloved implement for hand picking citrus fruit and the like, comprises a glove, and an elongated cutting member attached to the glove, the elongated cutting member comprising a first blade disposed along a first finger of the glove and an opposed second blade disposed along an adjacent second finger of the glove, the elongated cutting member defining an opening at first, outer ends of the opposed blades for passage of a citrus fruit stem between the blades, and the blades lying relatively closer together in a region spaced from the outer ends.

In a preferred embodiment of this aspect of the invention, the first blade and the second opposed blade intersect at their respective, inner ends.

According to another aspect of the invention, a method for hand picking citrus fruit and the like comprises providing a gloved implement as described above; placing the glove upon the hand of a picker; passing the gloved hand about a citrus fruit to be picked, with the first and second fingers of the glove bearing the opposed first and second blades of the cutting member disposed to pass the citrus fruit stem through the opening and between the blades, moving the citrus fruit stem between the first and second blades toward the region spaced from the outer ends of the blades, causing the fruit stem between the first and second opposed blades to engage the cutting member thereby to sever the citrus fruit stem, and removing the fruit from the tree.

These and other features and advantages of the invention will be seen from the following description of a presently preferred embodiment, and from the claims.

DESCRIPTION OF PRESENTLY PREFERRED EMBODIMENTS

We first briefly describe the drawings.

FIGS. 4, 5 and 5A, 6 and 6A, and 7 are somewhat diagrammatic views of a fruit picking sequence using an implement of the invention.

Figure 1:
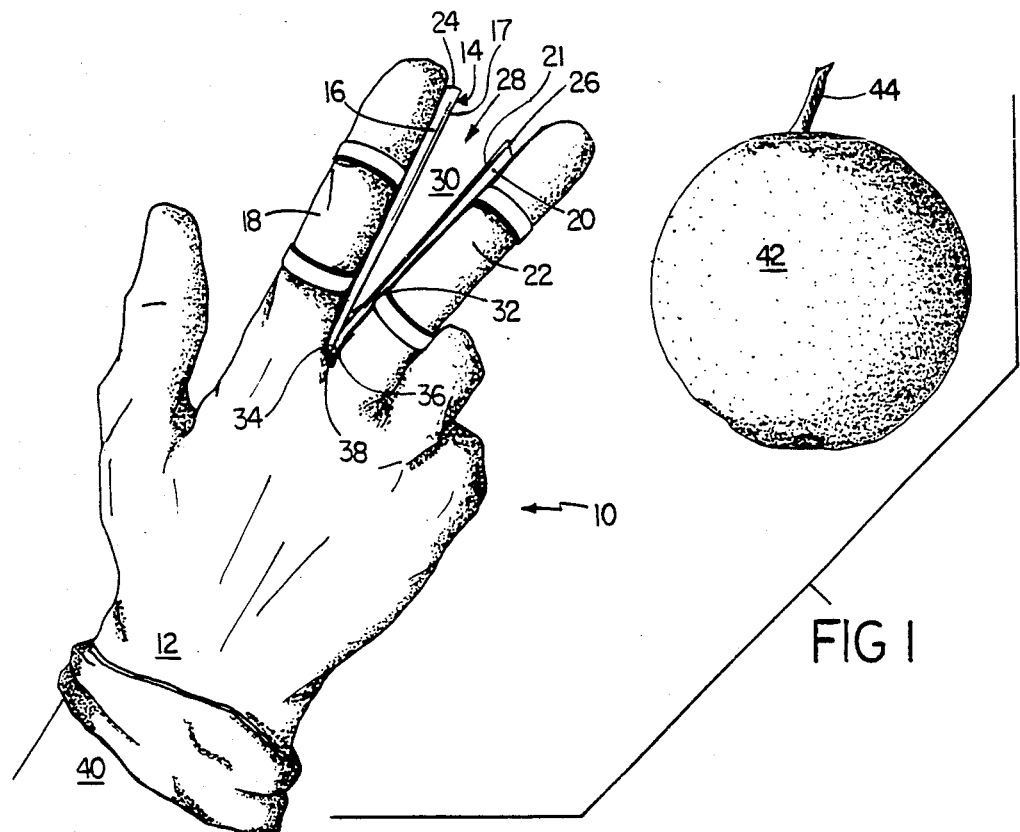
FIG. 1 is a perspective view of an implement of the invention for picking fruit.
Figures 2, 3:
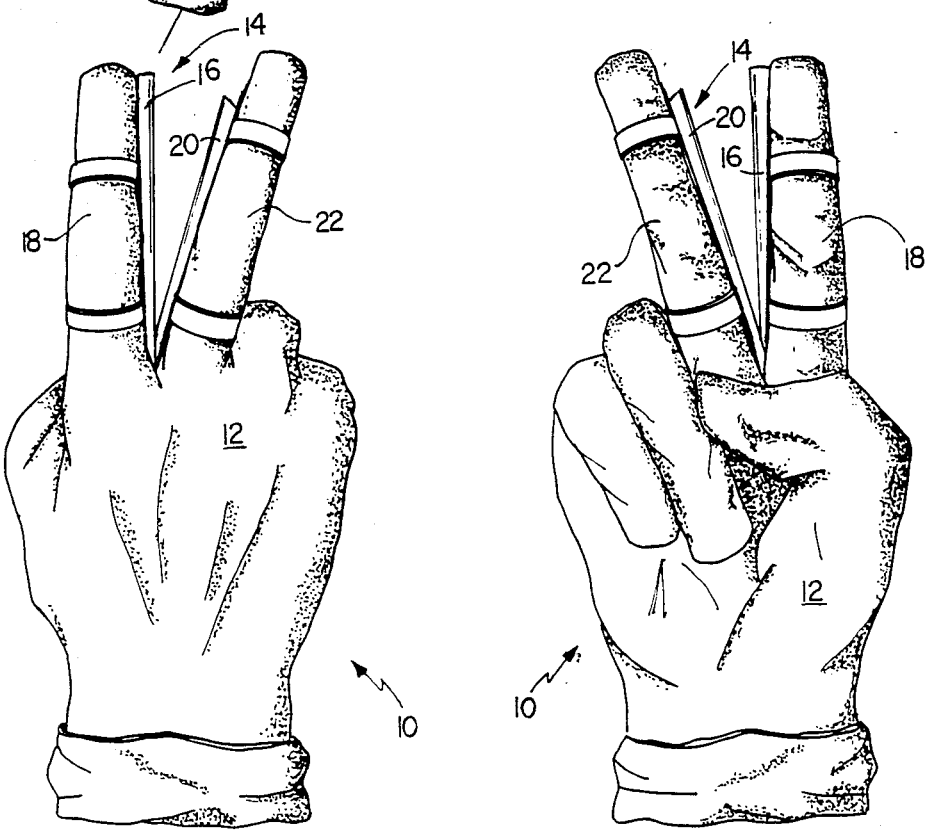
FIG. 2 is a top plan view of the implement of FIG. 1.
FIG. 3 is a bottom plan view of the implement of FIG. 1.

Referring to FIGS. 1, 2 and 3, an implement 10 for hand picking citrus fruit and the like includes a glove 12 and, attached thereto, an elongated cutting member 14. The glove is formed of any suitable material, e.g. cloth or rubber. The cutting member has a first, somewhat flexible blade 16 disposed along a first (index) finger 18 of the glove and an opposed, second, somewhat flexible blade 20 disposed along a second, adjacent (fore) finger 22 of the glove. The blades 16, 20, formed, e.g. of stainless steel, define cutting edges 17, 21, respectively, and are attached to the fingers of the glove by means of adhesive, or by stitching. The outer ends 24, 26 of cutting member blades 16, 20 cooperatively define an opening 28 for passage of a citrus fruit stem into the region 30 between the blades. The region 30 between the blades narrows toward the inner end 32 and the blades intersect at their respective inner ends 34, 36 to be joined at 38, e.g. by means of adhesive or the like.

Figure 4:
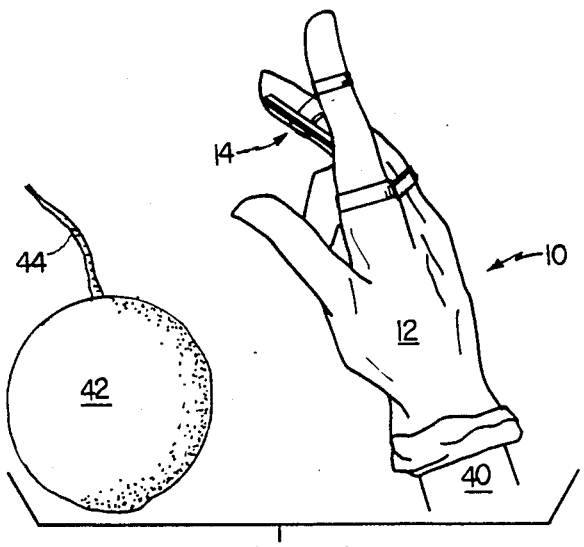

Referring now to FIGS. 4 et seq., the gloved implement 10 of the invention is used for hand picking citrus fruit and the like by placing the glove 12 on the picker's hand 40 (the glove may be either right- or left-handed), with the fingers of the hand received snugly within the glove fingers 18, 22 (FIG. 4).

Figure 5:
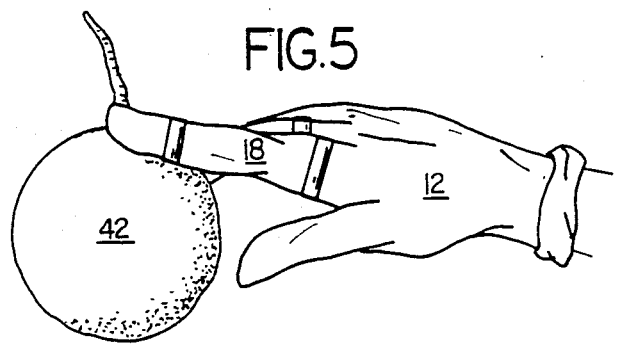
Figure 6:
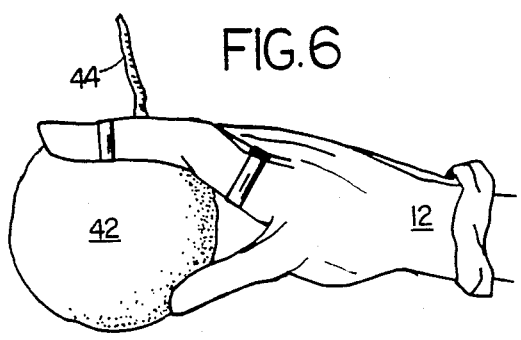
Figure 5A:
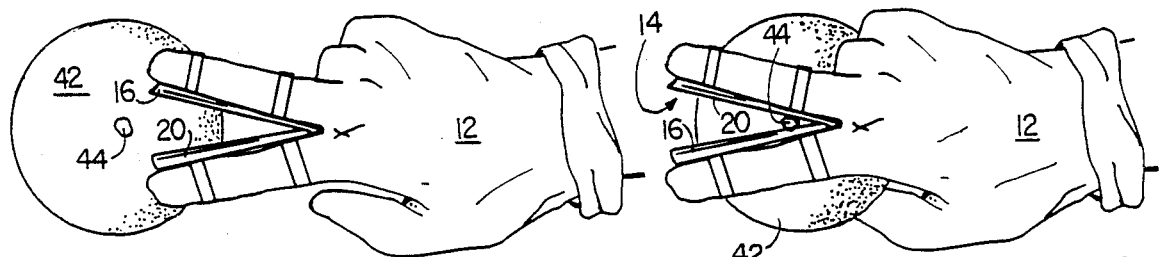
Figure 6A:
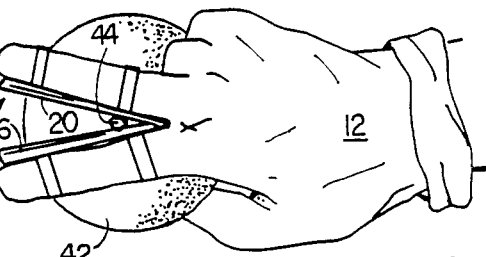
Figure 7:
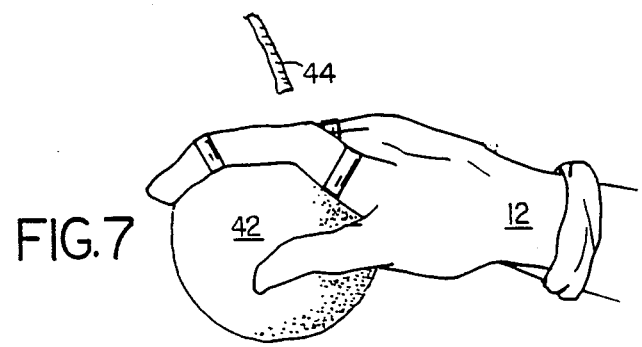

The picker selects a fruit, e.g. an orange 42, to be picked, and passes the gloved hand about the fruit, with the fruit stem 44 passing through the opening 28 and into the region 30 between the opposed first and second blades 16, 20 of the cutting member 14, attached along the first and second fingers 18, 22 of the glove 12 (FIGS. 5, 5A). The grasping motion of the picker's hand about the fruit continues, causing the fruit stem 44 to move between the first and second blades toward the narrowing region 32 at the inner ends 34, 36 of the blades where the fruit stem is caused to engage upon the cutting edges 17, 21 of one or both blades of the cutting member (FIGS. 6, 6A), causing the fruit to severed from the tree (FIG. 7).

In this manner, using the gloved implement 10 of the invention, the picker is able to pick fruit from the tree, severing it from the branch in the single grasping motion, without the necessity also of twisting and pulling, the less time efficient and energy sapping steps otherwise required.

Other embodiments are within the following claims.

What is claimed is:

1. An implement for hand picking citrus fruit and the life, comprising
   an elongated cutting member having an axially-elongated first, flexible blade with a flexible first cutting edge disposed axially along said first blade and an opposed, axially-elongated, second, flexible blade with an opposed flexible cutting edge disposed axially along said second blade, said elongated cutting member defining a first, open outer end for passage of a citrus fruit stem between the cutting edges of said first flexible blade and said second flexible blade, and said elongated cutting member defining a second, relatively more closed inner end, and means for attachment of said axially elongated cutting member to a user's hand with said first, axially-elongated flexible blade along an index finger of the user's hand and said second, axially-elongated flexible blade along an adjacent, middle finger of the user's hand, the flexible cutting edges of said first flexible blade and said opposed, second flexible blade adapted to act in concert for cutting said stem.

2. The implement of claim 1 wherein said means for attachment comprises at least one sleeve member adapted to receive a user's finger snugly therethrough.

3. The implement of claim 1 or 2 further comprising a glove, said means for attachment comprising fingers of said glove.

4. The implement of claim 1 wherein said first flexible blade and said second opposed flexible blade intersect at said second, inner end.

5. A gloved implement for hand picking citrus fruit and the like, comprising a glove, and an elongated cutting member attached to said glove, said elongated cutting member comprising an axially-elongated first, flexible blade with a flexible cutting edge disposed axially along said first blade disposed along an index finger of said glove and an opposed, axially-elongated, second, flexible blade with an opposed flexible cutting edge disposed axially along said second blade disposed along an adjacent, middle finger of said glove, said elongated cutting member defining an opening between first, outer ends of the opposed flexible blades for passage of a citrus fruit stem between said blades, and said blades lying relatively closer together in a region spaced from said outer ends for cutting the stem as it passes between said flexible blades, the flexible cutting edges of said first flexible blade and said opposed, second flexible blade adapted to act in concert for cutting said stem.

6. The gloved implement of claim 5 therein said first flexible blade and said second opposed flexible blade intersect at respective, inner ends of said blades.

7. A method for hand picking citrus fruit and the like comprising providing a gloved implement for hand picking citrus fruit and the like, comprising a glove, and an elongated cutting member attached to said glove, said elongated cutting member comprising an axially-elongated first, flexible blade with a flexible cutting edge disposed axially along said first blade disposed along an index finger of said glove and an opposed, axially-elongated, second, flexible blade with an opposed flexible cutting edge disposed axially along said second blade disposed along an adjacent, middle finger of said glove, said elongated cutting member defining an opening between first, outer ends of the opposed flexible blades for passage of a citrus fruit stem between said flexible blades, and said flexible blades lying relatively closer together in a region spaced from said outer ends, the cutting edges of said first flexible blade and said second flexible blade adapted to act in concert for cutting the stem;

placing said glove upon the hand of a user;

passing the gloved hand about a citrus fruit to be picked, with the fingers within said index and middle fingers of said glove, bearing said opposed first and second flexible blades of said cutting member, bent in a manner to pass around the citrus fruit with the stem passing through said opening and between the flexible cutting edges of said flexible blades, moving the gloved hand further in a manner to cause the citrus fruit stem between said first and second flexible blades to move toward said region spaced from said outer ends of the flexible blades, causing the fruit stem between said first and second opposed flexible blades to engage the flexible cutting edges of said cutting member thereby to sever the citrus fruit stem, and removing the fruit from the tree.

* * * * *